United States Patent [19]

Choi

[11] Patent Number: 5,180,928

[45] Date of Patent: Jan. 19, 1993

[54] CONSTANT VOLTAGE GENERATION OF SEMICONDUCTOR DEVICE

[75] Inventor: Yun-ho Choi, Incheon, Rep. of Korea

[73] Assignee: Samsung Electronics Co., Ltd., Suwon, Rep. of Korea

[21] Appl. No.: 767,616

[22] Filed: Sep. 30, 1991

[51] Int. Cl.$^5$ .............................................. H03K 3/013
[52] U.S. Cl. ............................... 307/296.6; 307/296.2; 307/296.8
[58] Field of Search ................ 307/296.6, 296.2, 296.8

[56] References Cited

U.S. PATENT DOCUMENTS

| | | | |
|---|---|---|---|
| 4,439,692 | 3/1984 | Beekmans et al. | 307/296.2 |
| 4,471,290 | 9/1984 | Yamaguchi | 307/296.6 |
| 4,705,966 | 11/1987 | Van Zanten | 307/296.2 |
| 4,739,191 | 4/1988 | Puar | 307/296.2 |
| 4,794,278 | 12/1988 | Vajdic | 307/296.2 |
| 4,920,280 | 4/1990 | Cho et al. | 307/296.2 |
| 5,029,282 | 7/1991 | Ito | 307/296.8 |
| 5,072,134 | 12/1991 | Min | 307/296.8 |
| 5,086,238 | 2/1992 | Watanabe et al. | 307/296.6 |

Primary Examiner—John S. Heyman
Assistant Examiner—Scott A. Ouellette
Attorney, Agent, or Firm—Rothwell, Figg, Ernst & Kurz

[57] ABSTRACT

A constant voltage generator of a semiconductor device includes an oscillator for generating an AC signal, a charge pump for pumping charge from a power voltage supply line by a predetermined pumping ratio in accordance with the AC signal of the oscillator, a charge storage capacitor for storing the pumped charge, and a voltage limiter for limiting the voltage across the charge storage capacitor at a predetermined voltage level, then outputting a constant voltage. According to the present invention, the charge of the storage capacitor is quickly stored, a constant voltage is obtained independent of a power source voltage, and the reference voltage output can be greater than the power source voltage.

7 Claims, 2 Drawing Sheets

CONSTANT VOLTAGE GENERATION OF SEMICONDUCTOR DEVICE

BACKGROUND OF THE INVENTION

The present invention relates to a constant voltage generator, and particularly to a constant voltage generator which is installed to a memory device or a VLSI chip for supplying a constant voltage independent of a power source voltage.

Generally, a memory device or a VLSI circuit has a reference voltage generator for internal system control. In a reference voltage generator according to common MOS techniques, the reference voltage is obtained by dividing a power source voltage, for example, the system power source voltage with transistor's loads.

Referring to FIG. 1, in a conventional reference voltage generator, two depletion mode transistors wherein the gate of one is connected to the source of the other, are serially connected between a power voltage supply line and ground, thereby obtaining a reference voltage at the common node of the transistors. In such a circuit, if the power source voltage varies, so does the reference voltage. Moreover, the reference voltage cannot be greater than the power source voltage.

SUMMARY OF THE INVENTION

Accordingly, it is an object of the present invention to provide a constant voltage generator capable of generating a constant voltage unaffected by power source voltage variations, in order to solve the problems of the above-mentioned conventional technique.

It is another object of the present invention to provide a constant voltage generator capable of generating a constant voltage which is greater than the system power source voltage.

It is yet another object of the present invention to provide a constant voltage generator having a charge pump suitable for quickly generating a constant voltage which is greater than the power source voltage.

To achieve these and other objects, a constant voltage generator of a semiconductor device is provided which comprises:
  an oscillator for generating an AC signal;
  a charge pump for pumping a charge from a power voltage supply line by a predetermined pumping ratio in accordance with the AC signal of the oscillator;
  a charge storage capacitor for storing the charge pumped by the charge pump; and
  a voltage limiter for limiting the voltage across the charge storage capacitor at a predetermined voltage level, and outputting a constant voltage.

Here, the charge pump of the constant voltage generator according to the present invention is composed of a plurality of stages each including: an amplifier for amplifying the AC signal supplied from a preceding stage, which also delays the signal for a predetermined time interval; a pump capacitor for storing a charge while the state of the amplifier's output is low, and for discharging during the output's high state; a first pump diode for supplying the charge from the power voltage supply line to the pump capacitor; and a second pump diode for supplying the charge stored in the pump capacitor to the pump capacitor of the succeeding stage.

Therefore, according to the constant voltage generator of the present invention, the charge storage capacitor is quickly stored by pumping charges from the power source supply line according to a pumping ratio in accordance with the AC signal frequency, independent of the power source voltage. Then, the voltage across the charge storage capacitor is limited to a predetermined voltage, thereby obtaining the desired constant voltage output. Further, a voltage which is higher than the power source voltage is obtainable.

BRIEF DESCRIPTION OF THE DRAWINGS

Other objects and advantages of the present invention will become more apparent by the following description with reference to accompanying drawings, in which.

DETAILED DESCRIPTION OF THE INVENTION

Figure 1:
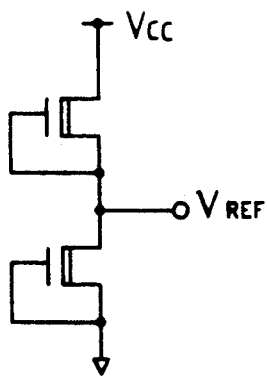
FIG. 1 is a circuit diagram of a conventional reference voltage generator.
Figure 2:
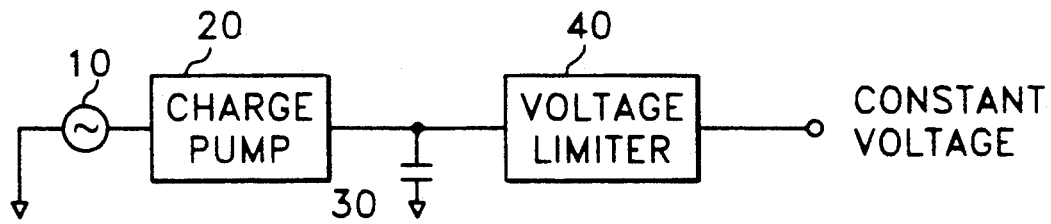
FIG. 2 shows the construction of a constant voltage generator according to the present invention.

Referring to FIG. 2, a constant voltage generator according to an embodiment of the present invention includes an oscillator 10 for generating an AC signal of a certain frequency; a charge pump 20 for pumping charge from a power voltage supply line, which is driven by the AC signal of the oscillator 10; a charge storage capacitor 30 for storing the charge pumped by the charge pump 20; and a voltage limiter 40 for outputting a constant voltage by limiting the voltage across the charge storage capacitor 30 at a predetermined level.

Figure 3:
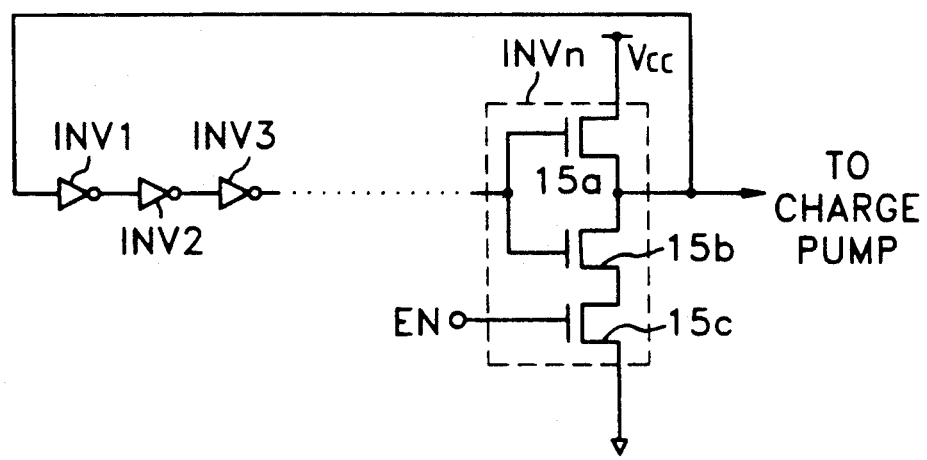
FIG. 3 is a circuit diagram of an embodiment of a ring oscillator shown in FIG. 2.

Referring to FIG. 3, oscillator 10 is a ring oscillator in which the output of n cascaded CMOS inverters INV-1–INVn is fedback to the input of the first inverter INV1. The last inverter INVn is provided so as for the oscillator to be enabled by a system enable signal EN. That is, in this inverter construction wherein PMOS and NMOS transistors 15a and 15b are connected in series between the supply voltage and ground, the source of the NMOS transistor 15b is grounded through another enabling transistor. The gate of NMOS transistor 15c is fed with the enable signal EN, to be turned on during a high logic input. The approximate frequency of the ring oscillator is given by $(2Tdn)^{-1}$, where Td is the time delay of one CMOS inverter and n is the number of inverters. Although a ring oscillator 10 is herein given as an example, any kind of oscillator may serve as oscillator 10 provided it can be installed on a VLSI chip.

Figure 4:
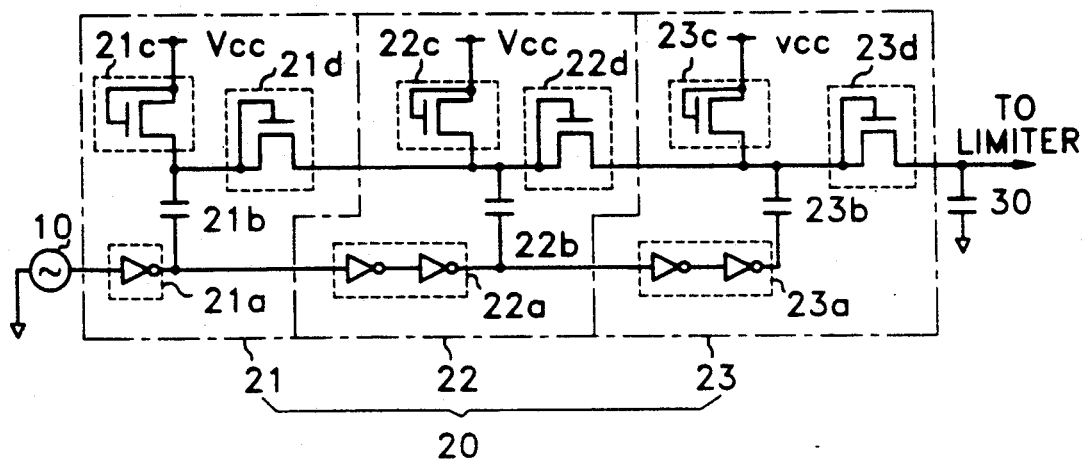
FIG. 4 is a circuit diagram of an embodiment of a charge pump shown in FIG. 2.

Referring to FIG. 4, the charge pump 20 is composed of a three stage cascade connection, each stage of which includes amplifiers 21a–23a, pump capacitors 21b–23b, first pump diodes 21c–23c, and second pump diodes 21d–23d. The first stage 21 is connected such that the AC signal outputted from the oscillator 10 is supplied to one end of the pump capacitor 21b using a CMOS inverter as the amplifier 21a; the other end of the pump capacitor 21b is supplied with charges from a power voltage supply line Vcc through the first pump diode 21c; and the charge stored in the pump capacitor 21b is supplied to the pump capacitor 22b of the next stage through the second pump diode 21d. The connections of the second stage 22 and third stage 23 are similar to that of the first stage 21, except that a CMOS buffer composed of two cascaded CMOS inverters as amplifiers 22a and 23a is employed in order to drive their respective pump capacitors by a delayed AC signal which is supplied from the preceding stage at predetermined time intervals. Therefore, when the AC signal at a low state is supplied to the pump capacitor of the preceding stage, the pump capacitor is charged from the power voltage supply line Vcc through the first pump diode. When the AC signal is at a high state, the charge stored in the pump capacitor is pumped to the supply voltage side of the next stage's pump capacitor through the second pump diode. In the next stage, since the amplifiers 21a-23a delay the AC signal from the preceding stage for a predetermined time to drive the pump capacitor, the charge pumped in the preceding stage and the charge stored in the pump capacitor thereof are pumped to the succeeding stage. As a result, the charge pumped in the last stage is the sum of the charge of every stage. The output of charge pump 20 is stored in the charge storage capicator 30 having a larger capacity. Here, the first and second pump diodes 21c-23c and 21d-23d are actually formed by MOS transistors serving as diodes. It should be noted that a common PN junction diode or any other unipolar current-conductive device may also be used. The above-described charge pump 20 is formed by cascading a plurality of stages together, so as to more quickly pump the desired charge.

Figure 5:
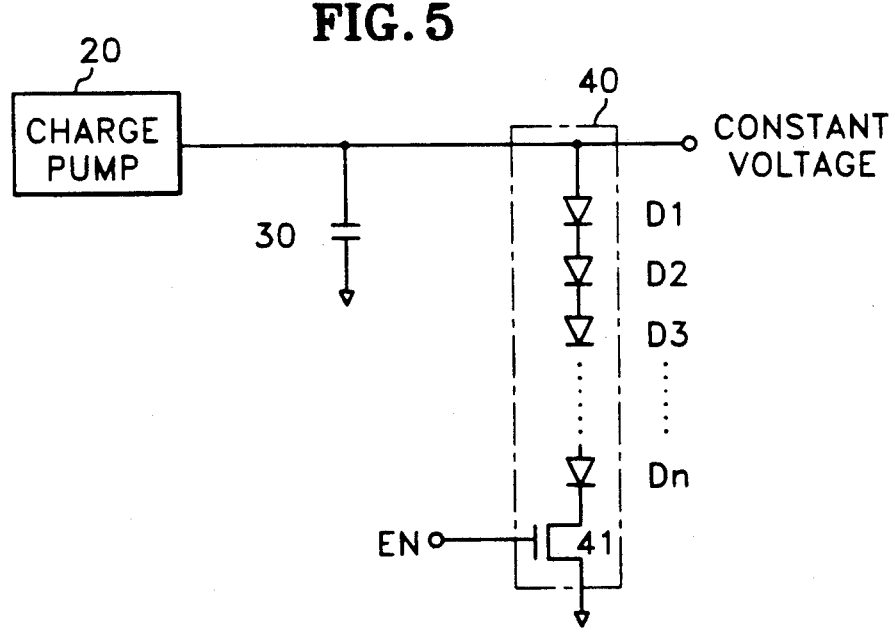
FIG. 5 is a circuit diagram of an embodiment of a voltage limiter shown in FIG. 2.

Referring to FIG. 5, the voltage limiter 40 is formed by serial connection of a forward-biased plurality of diodes D1-Dn across the charge capacitor 30, through a MOS transistor 41 which is also turned on and off by the enable signal. Accordingly, the sum of the forward-biased voltage of the n diodes is output by a certain voltage at an output terminal 50, when enable signal EN is high. Therefore, a predetermined constant voltage can be obtained by specifying the number of connected diodes. The diodes may be MOS diodes or a zener diode.

In the present invention as described above, the charge storage capacitor is stored by pumping charges from the power source supply line by a pumping ratio in accordance with the AC signal frequency, then the voltage across the charge storage capacitor are limited and output at the desired voltage level. As a result, a constant voltage can be obtained independent of the power source voltage. Further, the obtained voltage can be greater than the power source voltage, which makes it suitable for the control circuitry of a VLSI system or a memory device.

What is claimed is:

1. A constant voltage generator of a semiconductor device comprising:
   an oscillator for generating an AC signal;
   a charge pump for pumping a charge from a power voltage supply line by a predetermined pumping ratio in accordance with the AC signal of said oscillator;
   a charge storage capacitor for storing the charge pumped by said charge pump; and
   a voltage limiter for limiting the voltage across said charge storage capacitor to a predetermined voltage, and outputting a constant voltage,
   wherein said charge pump is formed by a plurality of stages each including: an amplifier for amplifying said AC signal supplied from a preceding stage, which also delays said AC signal for a predetermined time interval; a pump capacitor for storing a charge while the state of said amplifier's output is low, and for discharging during the output's high state of the output; a first pump diode for supplying the charge from said power voltage supply line to said pump capacitor; and a second pump diode for supplying the charge stored in said pump capacitor to the pump capacitor of a succeeding stage.

2. A constant voltage generator of a semiconductor device as claimed in claim 1, wherein said generator is a ring oscillator formed by a cascaded connection of a plurality of CMOS inverters.

3. A constant voltage generator of a semiconductor device as claimed in claim 1, wherein said first and second pump diodes are formed by any one of a PN junction diode, a MOS transistor serving as a diode, and any other unipolar current-conductive device.

4. A constant voltage generator of a semiconductor device as claimed in claim 1, wherein said voltage limiter sets a predetermined level by a voltage drop of a plurality of forward-biased diodes.

5. A constant voltage generator of a semiconductor device as claimed in claim 1, wherein said voltage limiter sets a predetermined level by the threshold voltage of a plurality of MOS transistors serving as diodes.

6. A constant voltage generator of a semiconductor device as claimed in claim 1, wherein said a zener diode. oscillator and said voltage limiter are enabled by an enable signal supplied externally.

7. A constant voltage generator of a semiconductor device as claimed in claim 1, wherein said oscillator and said voltage limiter are enabled by an enable signal supplied externally.

* * * * *

UNITED STATES PATENT AND TRADEMARK OFFICE
CERTIFICATE OF CORRECTION

PATENT NO. : 5,180,928
DATED : January 19, 1993
INVENTOR(S) : Yun-ho Choi

It is certified that error appears in the above-identified patent and that said Letters Patent is hereby corrected as shown below:

On the title page, item [54] and column 1, line 2, after "OF" insert --A--.

Col. 1, line 1, after "OF" insert --A--.

Col. 4, line 46, after "said" insert --voltage limiter sets a predetermined level by a zener voltage of--.

Col. 4, delete lines 47-48.

Signed and Sealed this

Fourth Day of January, 1994

Attest:

BRUCE LEHMAN

*Attesting Officer*      *Commissioner of Patents and Trademarks*